US012228043B1

(12) United States Patent
Fischbach et al.

(10) Patent No.: US 12,228,043 B1
(45) Date of Patent: Feb. 18, 2025

(54) CARBON SEAL COVERS

(71) Applicant: RTX Corporation, Farmington, CT (US)

(72) Inventors: Mitchell J. Fischbach, Pine Mountain Valley, GA (US); Jacob Barnes, Columbus, GA (US); Timothy A. Watford, Waverly Hall, GA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/536,686

(22) Filed: Dec. 12, 2023

(51) Int. Cl.
*F01D 25/24* (2006.01)
*F01D 11/00* (2006.01)
*F01D 25/16* (2006.01)

(52) U.S. Cl.
CPC ............ *F01D 25/24* (2013.01); *F01D 11/003* (2013.01); *F01D 25/16* (2013.01); *F05D 2220/32* (2013.01); *F05D 2230/70* (2013.01); *F05D 2240/50* (2013.01); *F05D 2240/55* (2013.01)

(58) Field of Classification Search
CPC ........ F01D 25/24; F01D 25/16; F01D 25/285; F01D 11/003; F05D 2220/32; F05D 2240/50; F05D 2240/55; F05D 2230/70; F16J 15/3464; B25B 27/0028
See application file for complete search history.

(56) References Cited

U.S. PATENT DOCUMENTS

| | | | | |
|---|---|---|---|---|
| 3,123,902 | A * | 3/1964 | Isenbarger | B25B 27/0028 29/282 |
| 3,651,557 | A * | 3/1972 | Bagley | B25B 27/023 29/260 |
| 3,762,727 | A * | 10/1973 | Jackowski | F16J 15/3456 277/374 |
| 4,551,898 | A * | 11/1985 | Provost | B25B 27/0028 29/263 |
| 4,815,747 | A * | 3/1989 | Wolford | F16J 15/348 277/306 |
| 5,174,006 | A * | 12/1992 | Ellis | B25B 27/28 29/275 |
| 6,543,113 | B1 * | 4/2003 | Khurana | B25B 27/062 29/402.02 |
| 10,718,234 | B2 * | 7/2020 | Witlicki | F01D 11/003 |
| 11,125,094 | B2 | 9/2021 | Miller et al. | |
| 2015/0337674 | A1 * | 11/2015 | Sonokawa | F02C 7/28 415/173.3 |
| 2019/0063247 | A1 * | 2/2019 | Walker | F01D 11/003 |
| 2020/0300167 | A1 * | 9/2020 | Von Berg | F01D 25/243 |
| 2021/0207490 | A1 * | 7/2021 | Maldonado | B25H 3/006 |
| 2023/0201979 | A1 | 6/2023 | Massicotte et al. | |

* cited by examiner

*Primary Examiner* — Woody A Lee, Jr.
*Assistant Examiner* — Joshua R Beebe
(74) *Attorney, Agent, or Firm* — CANTOR COLBURN LLP

(57) ABSTRACT

A compression tool for a seal assembly of a gas turbine engine includes a cover configured to be installed to a seal assembly. The seal assembly includes a seal carrier, a seal element installed to the seal carrier, the seal element configured as a ring, and one or more biasing elements configured to axially bias a position of the seal element. The cover includes a cover body, and a cover flange including a flange groove configured to cover the seal element of the seal assembly.

20 Claims, 4 Drawing Sheets

CARBON SEAL COVERS

BACKGROUND

Exemplary embodiments of the present disclosure pertain to the art of gas turbine engines and in particular to carbon seals of, for example, bearing compartments of a gas turbine engine.

Carbon seals are utilized in a variety of locations in a gas turbine, such as bearing compartments or the like. These seals are under spring tension in the engine, and the springs must be compressed for assembly into and/or disassembly from the gas turbine engine utilizing tools in and around the carbon seal. Such compression utilizing the conventional tools and methods can damage the carbon seals, leading to replacement of this costly component.

BRIEF DESCRIPTION

In one exemplary embodiment, a compression tool for a seal assembly of a gas turbine engine includes a cover configured to be installed to a seal assembly. The seal assembly includes a seal carrier, a seal element installed to the seal carrier, the seal element configured as a ring, and one or more biasing elements configured to axially bias a position of the seal element. The cover includes a cover body, and a cover flange including a flange groove configured to cover the seal element of the seal assembly.

Additionally or alternatively, in this or other embodiments the flange groove has a cross-sectional shape to match a cross-sectional shape of the seal element.

Additionally or alternatively, in this or other embodiments the cover includes a cover rim disposed radially outboard of the flange groove and configured to interface with the seal carrier radially outboard of the seal element.

Additionally or alternatively, in this or other embodiments a threaded rod extends through the cover via cover opening, and a knob is installed to the threaded rod and configured to be tightened to the cover.

Additionally or alternatively, in this or other embodiments tightening of the knob is configured to overcome a biasing force of the one or more biasing elements.

Additionally or alternatively, in this or other embodiments the one or more biasing elements are one or more springs.

Additionally or alternatively, in this or other embodiments the cover body is configured to be positioned radially inboard of the seal element.

In another exemplary embodiment, a seal assembly and compression tool arrangement of a gas turbine engine includes a seal assembly including a seal carrier, a seal element installed to the seal carrier, the seal element configured as a ring, and one or more biasing elements configured to axially bias a position of the seal element. A cover assembly is installed to the seal assembly, including a cover body and a cover flange including a flange groove configured to cover the seal element of the seal assembly.

Additionally or alternatively, in this or other embodiments the cover assembly is installed to the seal assembly in an axial direction.

Additionally or alternatively, in this or other embodiments the flange groove has a cross-sectional shape to match a cross-sectional shape of the seal element.

Additionally or alternatively, in this or other embodiments the cover includes a cover rim positioned radially outboard of the flange groove and configured to interface with the seal carrier radially outboard of the seal element.

Additionally or alternatively, in this or other embodiments a threaded rod extends through the cover via cover opening, and a knob is installed to the threaded rod and configured to be tightened to the cover.

Additionally or alternatively, in this or other embodiments tightening of the knob is configured to overcome a biasing force of the one or more biasing elements.

Additionally or alternatively, in this or other embodiments the one or more biasing elements are one or more springs.

Additionally or alternatively, in this or other embodiments the cover body is configured to be positioned radially inboard of the seal element.

In yet another exemplary embodiment, a method of disassembling a seal assembly of a gas turbine engine includes installing a cover over a seal element of the seal assembly. The cover includes a cover body and a cover flange including a flange groove configured to cover the seal element of the seal assembly. An axial force is applied to the cover to overcome a biasing force of one or more biasing elements of the seal assembly.

Additionally or alternatively, in this or other embodiments the cover is installed over a threaded rod via a cover opening in the cover, and a knob is installed onto the threaded rod and tightening the knob to the cover.

Additionally or alternatively, in this or other embodiments the one or more biasing elements are compressed via the tightening of the knob.

Additionally or alternatively, in this or other embodiments the one or more biasing elements bias a position of the seal element in an axial direction.

Additionally or alternatively, in this or other embodiments the one or more biasing elements are one or more springs.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
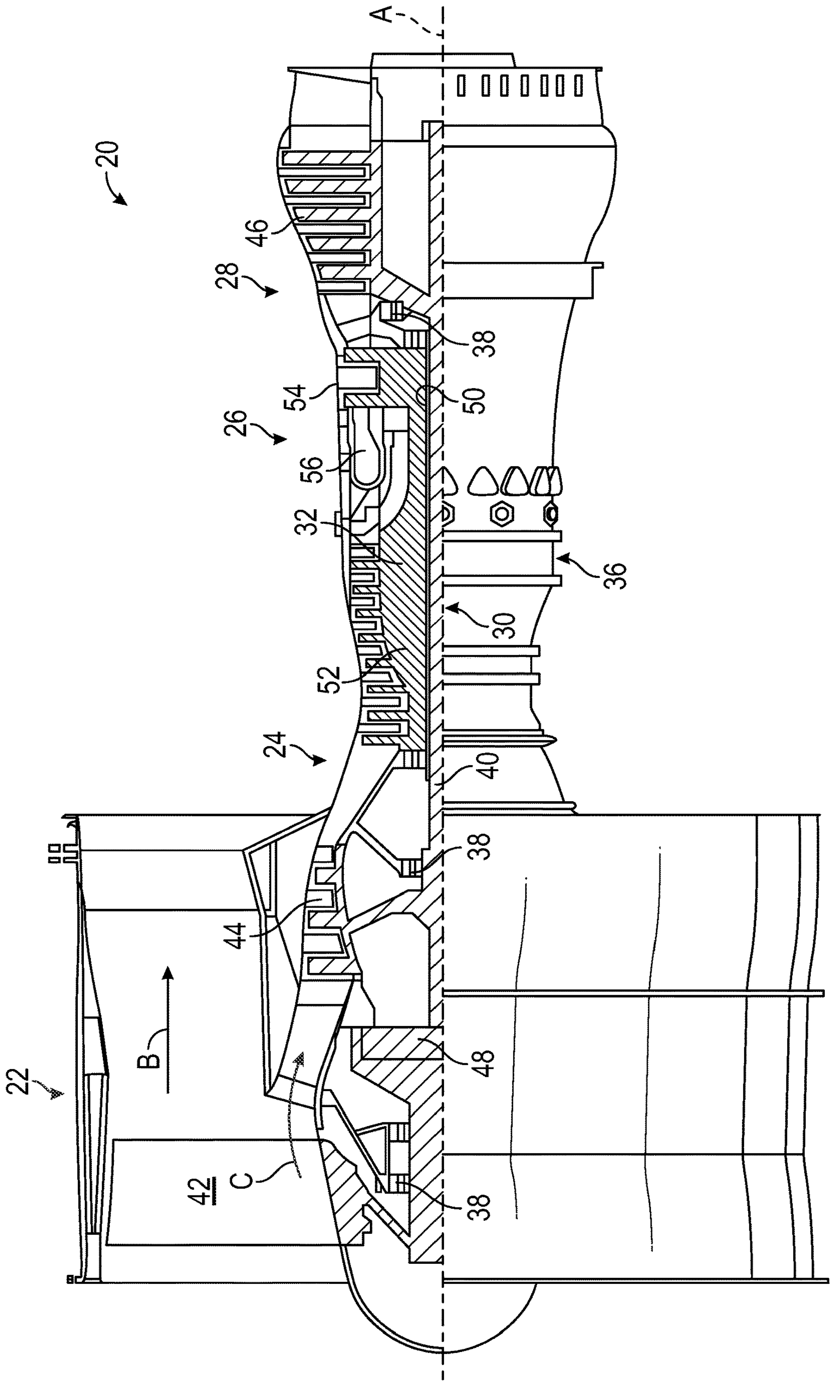
FIG. 1 is a partial cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/see divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
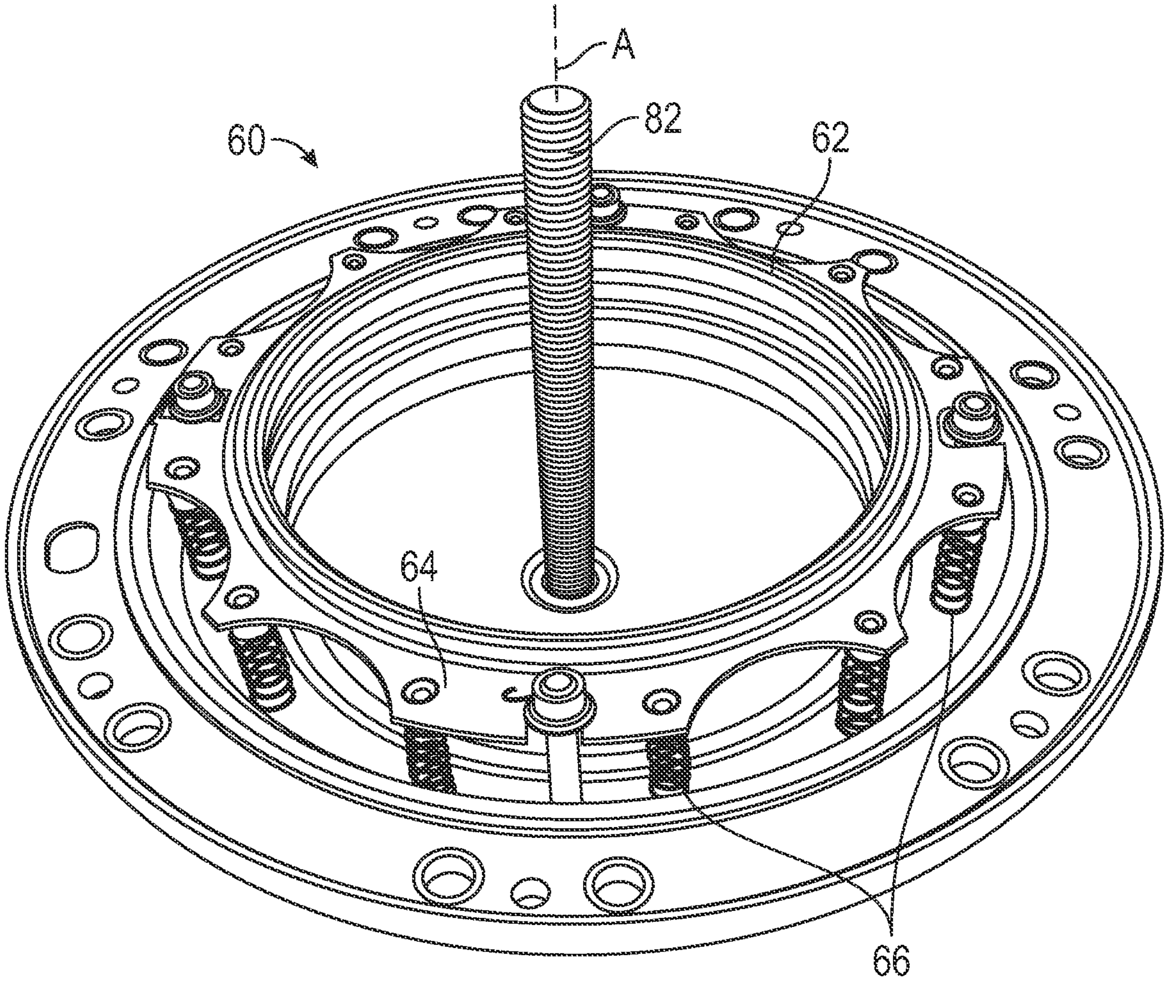
FIG. 2 is a perspective view of an exemplary embodiment of a seal assembly of a gas turbine engine.

Referring now to FIG. 2, bearing systems 38 include carbon seals 60 to aid in retaining oil in the bearing system 38, and to aid in keeping contaminants out of the bearing system 38. The carbon seals 60 include a seal element 62 nesting in or secured to a seal carrier 64 and a plurality of biasing elements, such as springs 66, arranged around the seal carrier 64 to bias the seal element 62 and seal carrier 64 toward a sealing surface (not shown). In the illustrated embodiment, the seal element 62 is a ring located at the engine central longitudinal axis A and the springs 66 urge the seal element 62 in an axial direction toward the sealing surface.

Figure 3:
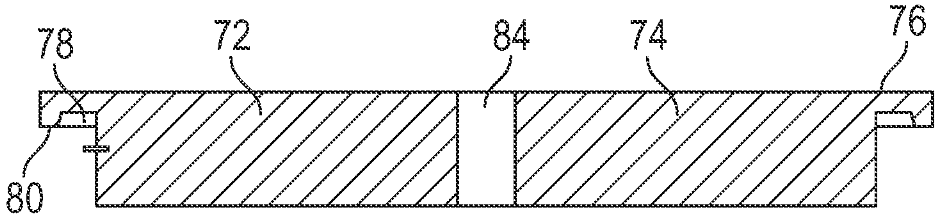
FIG. 3 is a cross-sectional view of an exemplary embodiment of a cover for a seal assembly.
Figure 4:
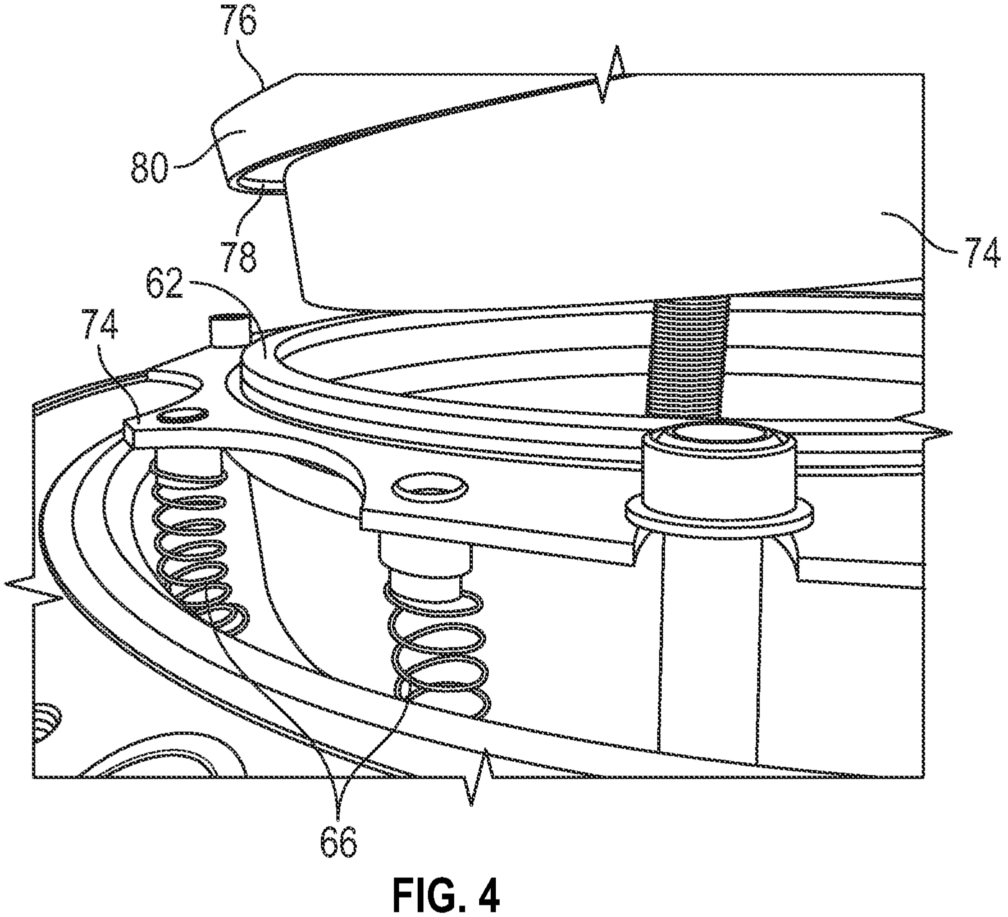
FIG. 4 is a partial perspective view of an embodiment of a cover installed to a seal assembly.

When assembling or disassembling the bearing system 38, the seal element 62 must be moved away from the sealing surface by compressing the springs 66. To do so, a mechanical press is utilized in conjunction with a protective cover 72 installed over the seal element 62 to prevent damage to the seal element 62 while compressing the springs 66, as shown in FIG. 3. The cover 72 includes a cover body 74 located at the engine central longitudinal axis A, and a cover flange 76 defining an outer perimeter of the cover 72. The cover 72 is configured such that the cover body 74 is located radially inboard of the seal element 62 when installed, and the cover flange 76 fits axially over the seal element 62. Further, in some embodiments, the cover flange 76 includes a flange groove 78 into which the seal element 62 fits when the cover 72 is installed, as also shown in FIG. 4. The flange groove 78 may have a cross sectional shape that matches a cross-sectional shape of the seal element 62. While the flange groove 78 fits over the seal element 62, the cover 72 further includes a cover lip 80 positioned radially outboard of the flange groove 78. The cover lip 80 is configured to rest on the seal carrier 64 radially outboard of the seal element 62.

Figure 5:
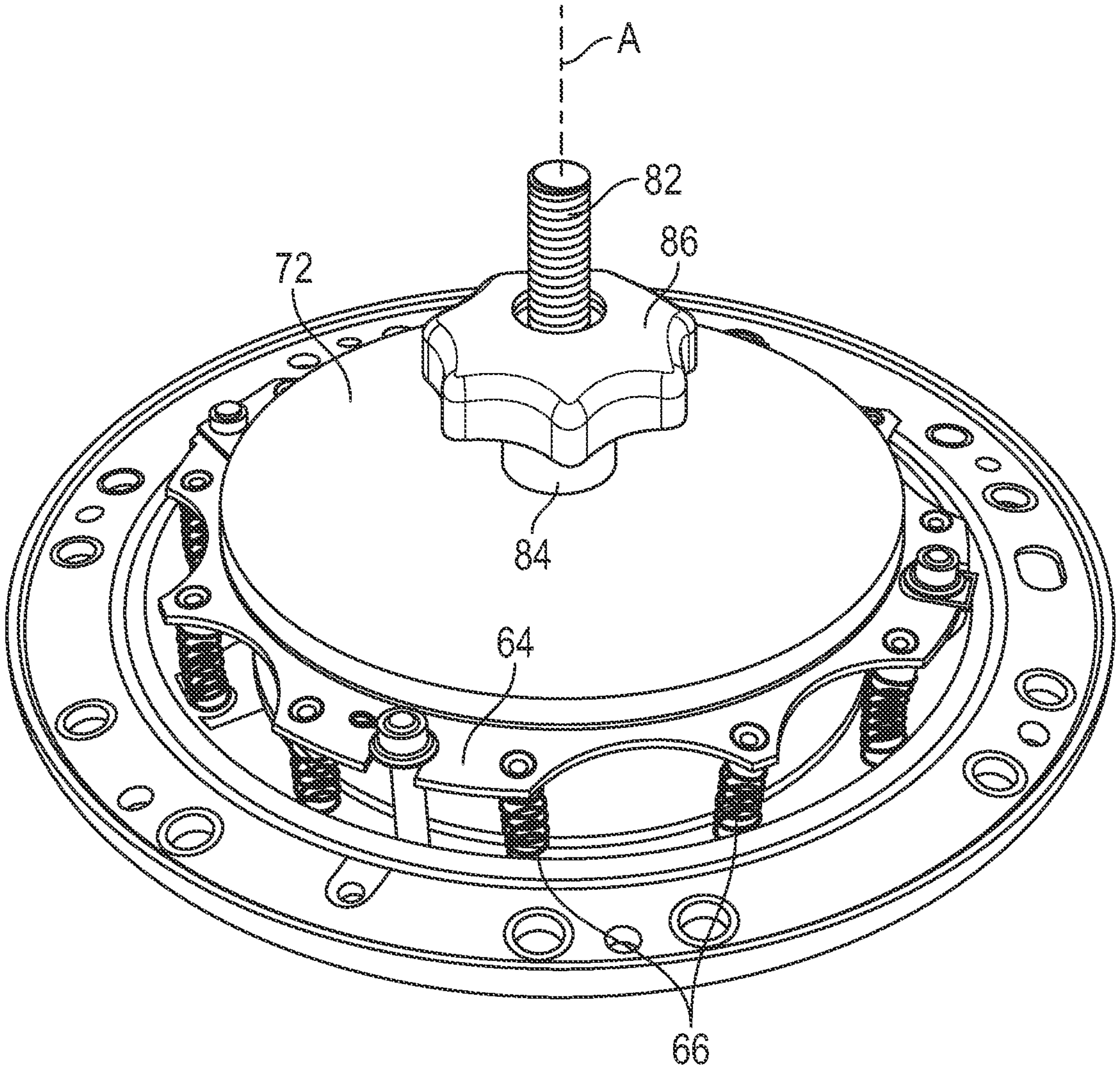
FIG. 5 is another perspective view of an embodiment of a cover installed to a seal assembly.

Referring to FIG. 5, in some embodiments the cover 72 is located on the seal 60 via a threaded rod 82 extending along the engine central longitudinal axis A. A cover opening 84 allows the cover 72 to be installed over the threaded rod 82 and locates the cover 72 at the engine central longitudinal axis A over the seal element 62. The cover 72 is then retained in position by a knob 86 that is installed onto the threaded rod 82 and tightened to the cover 72. In some embodiments, the springs 66 are compressed by tightening of the knob 84 on the threaded rod 82, which applies an axial force to the seal carrier 64 via the cover lip 80 to compress the springs 66. In other embodiments, the springs 66 may be compressed by other means, such as clamps arrayed around a circumference of the cover 72 or one or more hydraulic or pneumatic rams applying an axial force to the cover 72.

Use of the cover 72 prevents damage to the seal element 62 during maintenance or service operations on the carbon seal 60, while allowing for the application of force needed to compress the springs 66.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compression tool for a seal assembly of a gas turbine engine, comprising:
- a cover configured to be installed to a seal assembly, the seal assembly including:
  - a seal carrier;
  - a seal element installed to the seal carrier, the seal element configured as a ring, and extending in a first axial direction from the seal carrier; and
  - one or more biasing elements extending from the seal carrier in a second axial direction and configured to axially bias a position of the seal element toward the first axial direction;
- the cover including:
  - a cover body; and
  - a cover flange including a flange groove configured to cover the seal element of the seal assembly and to urge the seal carrier in the second axial direction.

2. The compression tool of claim 1, wherein the flange groove has a cross-sectional shape to match a cross-sectional shape of the seal element.

3. The compression tool of claim 1, wherein the cover includes a cover rim disposed radially outboard of the flange groove and configured to interface with the seal carrier radially outboard of the seal element.

4. The compression tool of claim 1, further comprising:
- a threaded rod extending through the cover via a cover opening;
- a knob installed to the threaded rod and configured to be tightened to the cover.

5. The compression tool of claim 4, wherein tightening of the knob is configured to overcome a biasing force of the one or more biasing elements.

6. The compression tool of claim 1, wherein the one or more biasing elements are one or more springs.

7. The compression tool of claim 1, wherein the cover body is configured to be disposed radially inboard of the seal element.

8. A seal assembly and compression tool arrangement of a gas turbine engine, comprising:
- a seal assembly, including:
  - a seal carrier;
  - a seal element installed to the seal carrier, the seal element configured as a ring, and extending in a first axial direction from the seal carrier; and
  - one or more biasing elements extending from the seal carrier in a second axial direction and configured to axially bias a position of the seal element toward the first axial direction; and
- a cover assembly installed to the seal assembly, including:
  - a cover body; and
  - a cover flange including a flange groove configured to cover the seal element of the seal assembly and to urge the seal carrier in the second axial direction.

9. The arrangement of claim 8, wherein the cover assembly is installed to the seal assembly in an axial direction.

10. The arrangement of claim 8, wherein the flange groove has a cross-sectional shape to match a cross-sectional shape of the seal element.

11. The arrangement of claim 8, wherein the cover includes a cover rim disposed radially outboard of the flange groove and configured to interface with the seal carrier radially outboard of the seal element.

12. The arrangement of claim 8, further comprising:
- a threaded rod extending through the cover via a cover opening;
- a knob installed to the threaded rod and configured to be tightened to the cover.

13. The arrangement of claim 12, wherein tightening of the knob is configured to overcome a biasing force of the one or more biasing elements.

14. The arrangement of claim 8, wherein the one or more biasing elements are one or more springs.

15. The arrangement of claim 8, wherein the cover body is configured to be disposed radially inboard of the seal element.

16. A method of disassembling a seal assembly of a gas turbine engine, the seal assembly including a seal carrier and a seal element installed to the seal carrier, the seal element configured as a ring, and extending in a first axial direction from the seal carrier, the method comprising:
- installing a cover over the seal element of the seal assembly, the cover including:
  - a cover body; and
  - a cover flange including a flange groove configured to cover the seal element of the seal assembly; and
- applying an axial force to the cover to overcome a biasing force of one or more biasing elements of the seal assembly and urge the seal carrier in a second axial direction opposite the first axial direction.

17. The method of claim 16, further comprising:
- installing the cover over a threaded rod via a cover opening in the cover;
- installing a knob onto the threaded rod and tightening the knob to the cover.

18. The method of claim 17, further comprising compressing the one or more biasing elements via the tightening of the knob.

19. The method of claim 16, wherein the one or more biasing elements bias a position of the seal element in an axial direction.

20. The method of claim 16, wherein the one or more biasing elements are one or more springs.

* * * * *